United States Patent [19]

Stolzer et al.

[11] Patent Number: 4,778,325
[45] Date of Patent: Oct. 18, 1988

[54] SHELF SERVICE APPARATUS IN THE FORM OF A CRANE

[75] Inventors: Paul Stolzer, Achern; Rudolf Blust, Sasbach-Obersasbach, both of Fed. Rep. of Germany

[73] Assignee: Robert Bosch GmbH, Stuttgart, Fed. Rep. of Germany

[21] Appl. No.: 1,487

[22] Filed: Jan. 8, 1987

[30] Foreign Application Priority Data

Jan. 25, 1986 [DE] Fed. Rep. of Germany ....... 3602201

[51] Int. Cl.$^4$ ............................................. B66F 9/18
[52] U.S. Cl. .................................. 414/276; 414/282; 414/286; 414/591; 414/607; 414/785
[58] Field of Search ............. 414/276, 281, 282, 607, 414/608, 274, 286, 591, 626, 785

[56] References Cited

U.S. PATENT DOCUMENTS

| | | | |
|---|---|---|---|
| 2,765,928 | 10/1956 | Riemenschneider | 187/9 X |
| 3,526,330 | 9/1970 | Armington et al. | 414/785 X |
| 3,643,825 | 2/1972 | Zane, Jr. | 414/607 |
| 4,005,786 | 2/1977 | Adelson et al. | 414/281 |
| 4,014,442 | 3/1977 | Adelson et al. | 414/542 X |
| 4,016,987 | 4/1977 | Stolzer | 414/785 X |

FOREIGN PATENT DOCUMENTS

| | | |
|---|---|---|
| 2911051 | 9/1980 | Fed. Rep. of Germany . |
| 3433736 | 3/1986 | Fed. Rep. of Germany . |
| 2175568 | 12/1986 | United Kingdom ................. 414/276 |

Primary Examiner—Robert J. Spar
Assistant Examiner—Stuart J. Millman
Attorney, Agent, or Firm—Edwin E. Greigg

[57] ABSTRACT

A shelf service apparatus in the form of a crane for storage of rod-shaped material that is accommodated in self-supporting pallet boxes, it being possible for the pallet boxes to be lifted by supports on their end faces by carrying devices which can be moved vertically and horizontally by a crane bridge that can be moved in the longitudinal direction of the storeroom. Furthermore, at least one load cross-piece is arranged in the crane bridge parallel to the pallet boxes in such a manner that it can be removed by the carrying devices, which load cross-piece is of the same length as the pallet boxes and is provided on its end faces with supports in a manner corresponding to the pallet boxes.

19 Claims, 8 Drawing Sheets

SHELF SERVICE APPARATUS IN THE FORM OF A CRANE

BACKGROUND OF THE INVENTION

The invention relates to a shelf service apparatus in the form of a crane for a storage of rod-shaped material that is accommodated in self-supporting pallet boxes onto stacking frames that are arranged transversely to the longitudinal direction of the storeroom and are in alignment with one another in the longitudinal direction of the storeroom. The frames are provided with pallet box supporting arms that are arranged in adjacent rows one above the other in the manner of shelves and extend in the longitudinal direction of the storeroom and are attached to vertical supports. The crane includes a crane bridge which can be conveyed in the longitudinal direction of the storeroom above or below the stacking frames and which extends transversely to the longitudinal direction of the storeroom and has load beams which are supported at both ends in such a manner that they can be raised and lowered outside the shelves and on which, transverse to the longitudinal direction of the storeroom, carrying means having their free ends pointing towards the stacking frames can be displaced in the longitudinal direction of the storeroom. As a result, both sides of each shelf aisle forms the center position which can be brought into engagement with supports projecting at the ends of the pallet boxes that are located at that point such that they support the pallet boxes.

In known devices of this type, the pallet boxes are arranged on both sides of each shelf aisle and accordingly, starting from the centre position formed by the shelf aisle, the carrying means can be displaced either to one side or to the other and can be moved synchronously on the load beam in order to lift the pallet boxes out of the shelf compartments and to convey them horizontally along the shelf aisle from where the pallet boxes can be transported further by vertical movement of the load beam and by movement of the crane bridge. When the pallet boxes are removed from a shelf aisle and taken to a different place, they are transported by a corresponding lifting movement of the load beam to a position with the crane bridge, so that they can be moved in the longitudinal direction of the storeroom above or below the shelf structure.

On the other hand, shelf stores are known in which, in the same manner as that described above, loose rod-shapd material lies in the shelf compartments, that is to say no additional pallet boxes or the like are used. This type of storage is used, for example, for automatic rapid access to the material. In this case the shelf service apparatus, which is constructed in the form of a portal crane, has a vertically and horizontally movable crane bridge which extends transversely to the longitudinal direction of the storeroom over the entire width of the store and has forked prongs that project to one side in the longitudinal direction of the storeroom for lifting the material. The material can be moved vertically over a shelf aisle as far as the desired shelf compartment and is then moved horizontally by moving the crane until the forked prongs are located under the material to be lifted. After the material has been lifted, it is transported by horizontal movement of the portal crane to the shelf aisle and, after vertical movement, is transported further optionally overhead or underneath the storage frame.

In the two afore-mentioned cases, the movements of the crane, the crane bridge and the load cross-piece, the load beam and the carrying means are numerically controlled and take place automatically taking into account the structure of the store, the positioning and type of the material, etc. These known features are not explained again in detail, but are of course, intended also to apply to the invention described hereinbelow; in the description of the invention, however, the fact that the individual movement sequences take place under automatic control will not be discussed in further detail, but this should be assumed.

Furthermore, in the two afore-mentioned cases, the transport of material from a store compartment generally serves to supply a machine that processes the material further, especially a cold saw, for which purpose the material is taken to a so-called removal compartment from which the cold saw is supplied with the rods of material in succession. Material that is not used up in the further processing is returned from the saw to the removal station and is returned to the associated store compartment in reverse sequence to that described above.

The disadvantage of the two storage devices described is that they are each suitable for only one of the types of storage, that is to say either only for the storage of material in pallet boxes or only for the storage of loose material, and this is essentially a result of the differing designs of the load-lifting means. In addition, the crane bridges for handling loose rod material have the disadvantage that the said forked prongs are generally arranged to project only to one side, so that the shelf compartments also can be provided only on that side of the shelf aisles, which increases the amount of space required for the store. If it is desired to reduce such a space requirement, it is necessary for the crane bridge to have a more complicated construction using additional structural means, so that it can lift rod-shaped material on both sides.

To the same end it could be possible to combine in one crane bridge the load-lifting means both for pallet boxes and for loose rod material. However, this would result in an extremely complicated, expensive structure taking up a large amount of space which, in addition, would require the shelf aisles to be of considerable width for the vertical movement of the crane bridge, so that, comparatively speaking, storage room capacity would be used up permanently.

The advantages underlying the invention is, therefore, to supplement and develop a shelf service apparatus for self-supporting pallet boxes of the type mentioned at the beginning in a simple, space-saving and thus economical manner so that it is also suitable for lifting loose rod material, so that it is thus possible to construct stores that contain shelf compartments both for pallet boxes and for loose rod material. At the same time, the crane is so constructed that it can be used for shelves on both sides of the aisle or at any position in the storage pallet in which boxes or loose rod material are arranged in the shelf compartments.

Taking as a basis, a shelf service apparatus of the type mentioned at the beginning, this problem is solved according to the invention as follows: in the crane bridge, at least on one side close to the center position, a load cross-piece of the same length as the pallet boxes is removably arranged parallel to the pallet boxes. The load cross-piece has on its end faces supports, corresponding to those of the pallet boxes, for the carrying means, and that there are fixedly connected to the load cross-piece load-lifting means which project horizontally on one side in the longitudinal direction of the storeroom. In order to remove or store material resting directly on supporting arms of corresponding shelf compartments, the cross piece load-lifting means can be inserted between the supporting arms by movement of the carrying means.

The essence of the invention therefore lies in constructing at least one load cross-piece for loose rod material in the same manner as a pallet box as regards its coupling with the crane bridge, so that it can be lifted out of its rest position within the crane bridge and manipulated in the same manner as a pallet box, so that this manipulation, in the same manner as the manipulation of a pallet box, at the same time includes all the movements that are necessary to manipulate loose rod material.

The measures according to the invention thus have the effect that the shelf service apparatus, which per se is suitable only for self-supporting pallet boxes, can be used in an extremely simple manner also for manipulating loose rod material, it being possible for the structural design of the load cross-piece to be reduced to the most simple form and otherwise to be simplified or standardized as a result of the fact that it is possible to use supports that are the same as those attached to the pallet boxes.

In addition, the 'stockpiling', according to the invention, of the mentioned load cross-piece within the crane bridge does not require any additional space, since at its top the crane bridge must in any case be constructed in such a manner that it can lift a pallet box to be transported away from the shelves. In the horizontal direction also, the necessary space is in any case available next to the said center position as a result of the necessary size of the crane bridge.

The measures according to the invention therefore not only allow a shelf storage to be constructed in such a manner that it is possible to store simultaneously both rod material stored in pallet boxes and loose rod material, but it is also possible to have mixed forms within a single shelf, in order, for example, that, starting from the place for further processing of the material, the crane running distances, and thus the crane running times, for frequently used material are made as short as possible, whilst material that is processed less frequently can be stored at the most remote areas.

It is especially advantageous if the supports and carrying means are constructed to engage one another in positively-locking manner in the vertical direction and in the longitudinal direction of the storeroom. In this manner, it is possible for the load cross-piece and optionally also the pallet boxes to be indexed with respect to the carrying means to avoid possible slipping of the part being lifted by the carrying means while the crane is moving. The side indexing can be effected, for example, by the supports having projections that project downwards in the manner of a wedge and engage in corresponding recesses in the carrying means. Many other possible designs are, however, conceivable and could be used.

Furthermore, it can be particularly advantageous if at least one vertically, automatically electrically, hydraulically or pneumatically movable clamping device can be displaced in the longitudinal direction of the storeroom and if the load cross-piece can be clamped against the carrying means by the clamping device. If the carrying means are assumed to be mounted, for example, on a horizontally movable carriage, then the carriage can at the same time have, at a suitable point above the carrying means, a vertically adjustable cylinder piston unit of which the movable part is placed in a clamping manner on the load cross-piece after the latter has been lifted by the lifting means. As a result, the above-mentioned positively-locking mutual engagement can also withstand high forces and can be of durable construction. Of course, the movement of this clamping device is also connected to the numerical control means mentioned at the beginning.

According to the invention it is in a simple manner, also possible and advantageous for load cross-pieces that are arranged in the crane bridge on both sides of the center position to have their load-lifting means pointing in opposite directions, so that loose rod-shaped material can be stored on both sides of a shelf aisle.

The further possibility arises here of constructing individual crane bridges differently in such a manner that their load-lifting means are designed for different regions of the material cross-section. Consequently, it is possible to achieve a further saving in space, since the shelf compartmets for material of relatively small cross-section need not be so high as the shelf compartments for thicker material, since, accordingly, the size of the particular load cross-piece is also matched to this height of the shelf compartments.

If it is desirable to make use of both the described possible designs of the load cross-pieces, that is to say to have both load-lifting means pointing in both directions and load-lifting means for material of different cross-sections, then it is advantageous for a further load cross-piece to be removably arranged above or below the mentioned load cross-pieces and for the load beams to be capable of being raised or lowered into the position corresponding to this load cross-piece.

As regards the load-lifting means of the load cross-pieces, these are advantageously constructed in the form of prongs, as is known in the prior art.

If, furthermore, the load lifting means are provided, in a manner known per se, with sensors, for example in the form of light barriers or the like, for the material, then it is advantageous according to the invention for the supports on the load cross-pieces and the carrying means to be assigned electrical contacts for connection of the sensors to the device for controlling the crane. In this manner, therefore, when a load cross-piece is lifted the sensors are automatically electrically connected via the carrying means to the crane control means or to a computer. The same naturally applies, for example, to pneumatic sensors, in that the corresponding pneumatic connections are then made for these connections.

DETAILED DESCRIPTION OF THE DRAWINGS

Further features and details of the invention can be found in the following description of an embodiment which is shown in the drawings.

Figure 1:
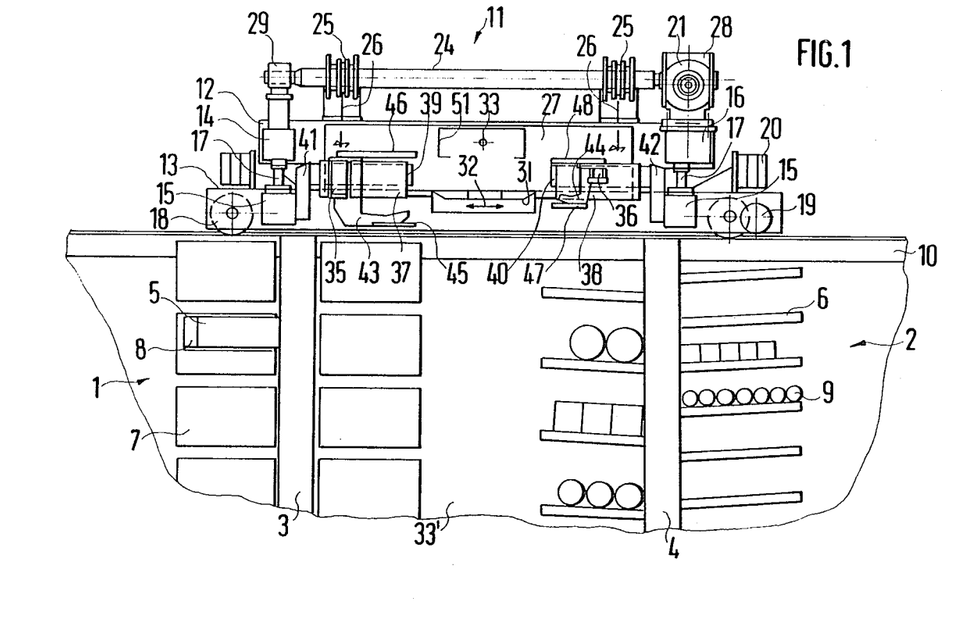
FIG. 1 is a simplified end view, partly in section, of a crane bridge.

FIG. 1 shows an upper section of a material storage rack having stackig frames 1, 2 which have vertical supports 3, 4 with supporting arms 5, 6. Any number of such stacking frames are arranged in alignment adjacent to one another in the direction of the plane of the paper in FIG. 1, corresponding to the longitudinal direction of the storeroom, and extend perpendicularly to the plane of the paper in FIG. 1 and thus transversely to the longitudinal direction of the storeroom, and they may extend downwards as far as desired, according to the particular spatial conditions.

The stacking frames 1 carry self-supporting pallet boxes 7, that is to say pallet boxes such that require no other support between their ends, by means of arms 5 that engage their ends. For this purpose, the pallet boxes 7, in which connection references is made also to FIGS. 2 and 3, have on their end faces U-shaped supports 8 with which they are supported by the arms 5. Only one example of this is shown.

In contrast, rods of material 9 are placed on the shelf compartments formed by the vertically supporting arms 6, of the stacking frames 2, in which connection, as regards each compartment of a stand or stacking frame, several supporting arms 6 are arranged one beside the other, optionally at varying spacing, in order to be capable of carrying different lengths of material 9, such as may also be produced, for example, when residual pieces of material remaining after processing are rturned to storage.

On their upper sides the stacking frames 1, 2 carry a pair of tracks 10 which extend in the longitudinal direction of the storeroom and on which a crane bridge, indicated as a whole by the reference numeral 11, can be moved. As can be seen in conjunction with FIGS. 2 and 3, the crane bridge 11 comprises a framework formed by longitudinal beams 12, 13 and cross-beams 14 to 16, the cross-beams 14 and 15, and 15 and 16 being connected to one another by vertical supports 17. On the longitudinal beams 13 there are rotatably arranged wheels 18 some of which are driven by drive motors 19 and by means of which the crane bridge 11 can be moved along the tracks 10. In addition, buffers 20 for limiting the path at the end of the store are affixed to the longitudinal beams 13.

A lifting motor 21 is attached to the above-described framework of the crane bridge 11, which lifting motor drives via shafts 22, 23 extending transversely to the longitudinal direction of the storeroom and via mechanisms 28, lifting shafts 24 which extend in the longitudinal direction of the storeroom and are rotatably mounted on the cross-beam 14 by means of bearing 29. The lifting shafts carry winding rollers 25 for winding up or letting down ropes or chains 26 on which there are suspended load beams 27 which can be raised or lowered close to the two transverse ends of the stacking frames 1 and 2 by rotation of the lifting shafts 24. The load beams 27 are connected to one another transverse to the longitudinal direction of the storeroom by a bridge 51.

Using the described drive means, the vertical movement of the load beams 27 takes place in exactly synchronous manner. The synchronism is assisted and an alteration in the length of the cabling mechanism 26 can be avoided if the cabling mechanism 26 is constructed in the form of a chain.

Figure 3:
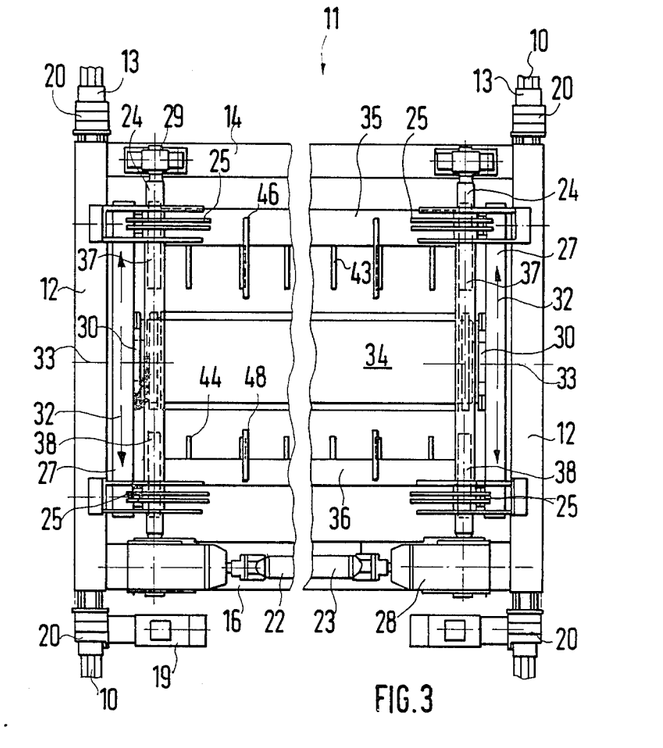
FIG. 3 is a simplified plan view, partly in section, of the crane bridge according to FIGS. 1 and 2.

On the load beams 27, carrying means 31, for example in the form of carrying bars, can be driven or pushed by way of carriages 30 or the like, to which the carrying means are attached, horizontally, that is to say in the longitudinal direction of the storeroom in accordance with the direction shown by the double-headed arrow 32 in FIGS. 1 and 3, the drive for this movement being effected synchronously by a common spindle 33 (see FIG. 1). The drive motor for the spindle 33, which can be constructed in customary manner, is not shown (it can be located on the bridge 51); other elements also not shown are, for example, chains for transmitting the drive movement to the carriages, the chains being guided over pulleys and being articulated on the carriages 30 and driven by the spindle 33, since the design of such drive means is known and can be constructed in many different ways. Thus, the load beam 27, which is suspended from the cables 26, does not move back and forth in the direction of the double-ended arrow 32; instead, it is the carriages 30 and the carrying bars 31 disposed thereon which are movable as indicated. Due to this mobility factor, the carrying bars 31 can also retrieve either the load cross-piece 35 or the load cross-piece 36. By means of the cables 26, the load beams 27 are movable only vertically.

Figure 1A:
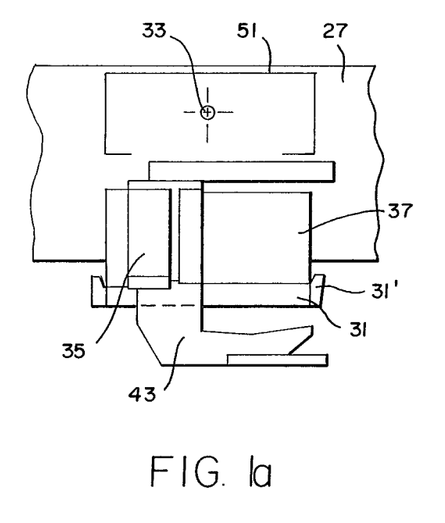
FIGS. 1a–1c are enlarged views of details of FIG. 1.
Figure 2:
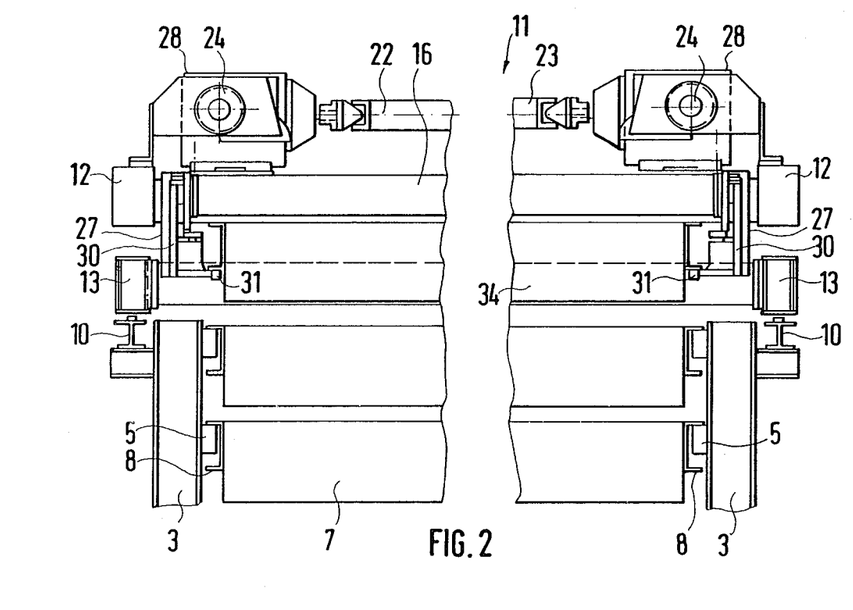
FIG. 2 is a simplified side view, partly in section, of the crane bridge according to FIG. 1.
Figure 2A:
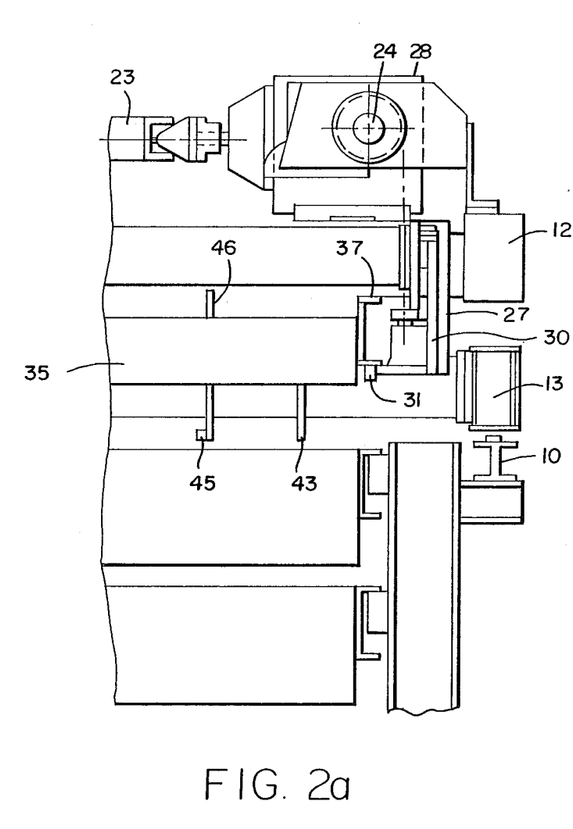
FIGS. 2a–2c are enlarged views of details of FIG. 2.

As can be seen especially from FIGS. 2 and 3, the arrangement of the load beams 27 and the carriages 30 is such that the carrying bars 31 projecting in the direction towards the stacking frames 1, 2 can be brought to rest under the supports 8 of the pallet boxes 7 when the carriages 30 are displaced horizontally. The pallet boxes 7 are then lifted out of the associated shelf compartment in simple manner as follows: the load beams 27 are raised slightly and then the carriages 30 are moved horizontally so that the pallet box in question is brought into onto the shelf aisle 33, (see FIG. 1) where the carriages 30 assume a central position on the load beams 27 in the horizontal direction. The pallet box can then be lifted upwards into the crane bridge 11 so that it arrives in the position shown in phantom by dashed lines at the numeral 34 in FIG. 1. By movement of the crane bridge 11, the pallet box 34 can then be taken to a different position. The pallet box is returned to storage in the reverse sequence to that described above. The carrying bars 31 are provided at their opposite lateral extremities with laterally and upwardly protruding retaining lugs 31' as best shown in FIG. 1a. An end view of the carrying bars is provided in FIG. 2a.

Figure 1B:
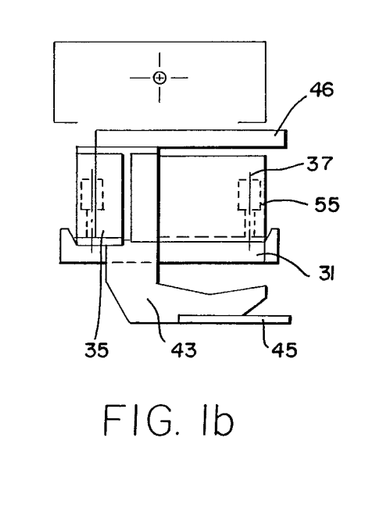
Figure 1C:
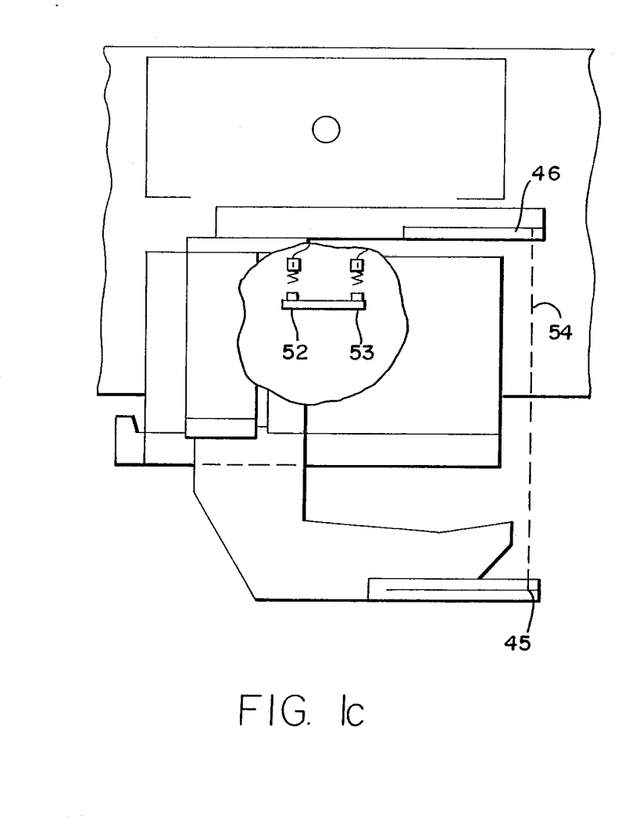
Figure 2B:
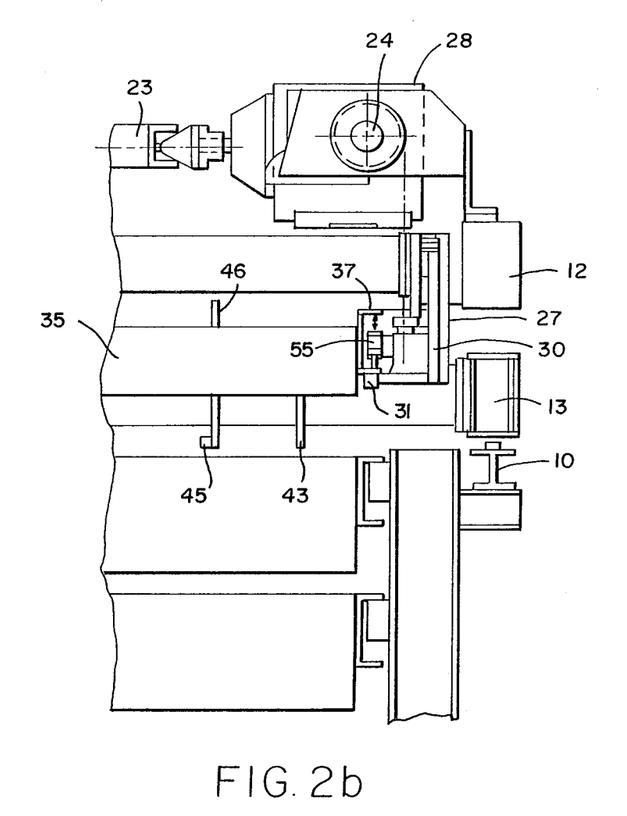
Figure 2C:
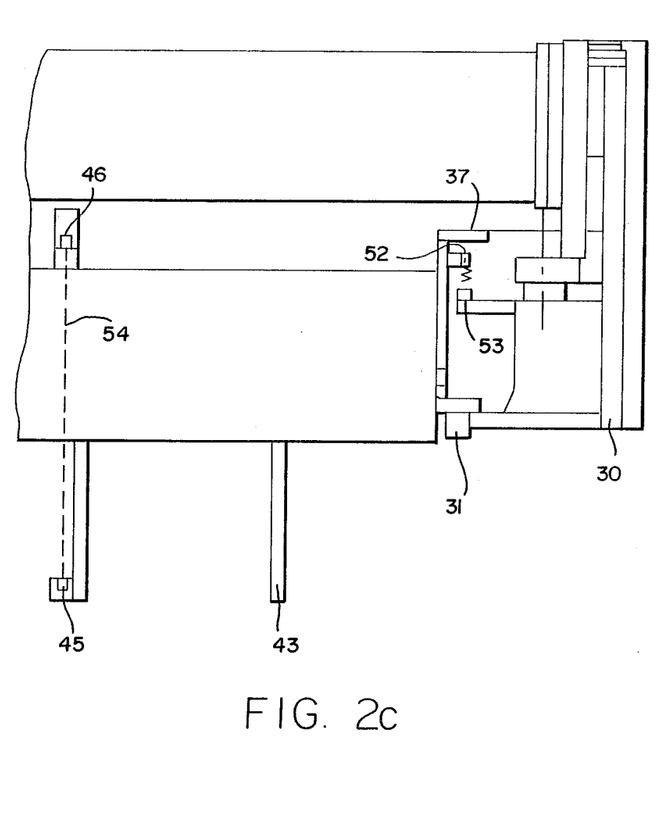

As can be seen especially from FIGS. 1 and 3, in addition, load cross-pieces 35, 36 are movably arranged close to but at a distance from the said center position inside the crane bridge 11, the length of which cross-pieces, measured perpendicular to FIG. 1, corresponds to the corresponding length of the pallet boxes 7 and which, like the pallet boxes, are provided at both ends with supports 37, 38 in the form of U-shaped profiles that are open towards the outside, by means of which they fit onto supporting arms 39, 40 that are attached to the cross-beams 15 by means of connection members 41, 42. The load cross-pieces 35, 36 have, distributed over their length, prongs 43, 44 which in the present case are directed towards the said center position, and in the present case it can be seen that the load cross-pieces 35, 36 are designed for material of different cross-sectional sizes, such as the material contained in the left-hand side of stacking frame 2, which is suitable for the load cross-piece 35, and on the right-hand side, which is suitable for the load cross-piece 36. Some prongs 43, 44 are also assigned light barriers which are attached to the ends of the prongs by attachment means 45, 46, 47 and 48. The light gate or electric eye 54 is best shown in FIG. 1c, which gate is connected to a pair of electrical contacts 52, 53. FIG. 2c shows the location of the contact set 52, 53 in a detailed side view of the chain bridge. The contacts are visible between the carriage 30 on one side and the support 37 on the other.

Figure 4:
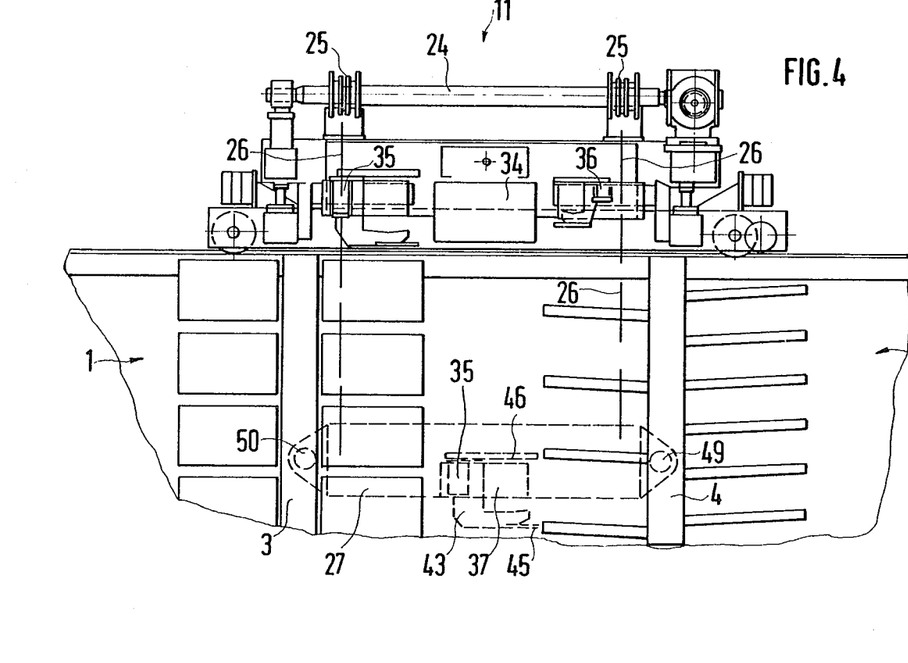
FIG. 4 is the view as in FIG. 1 supplemented by the outline of a different operating position.
Figure 5:
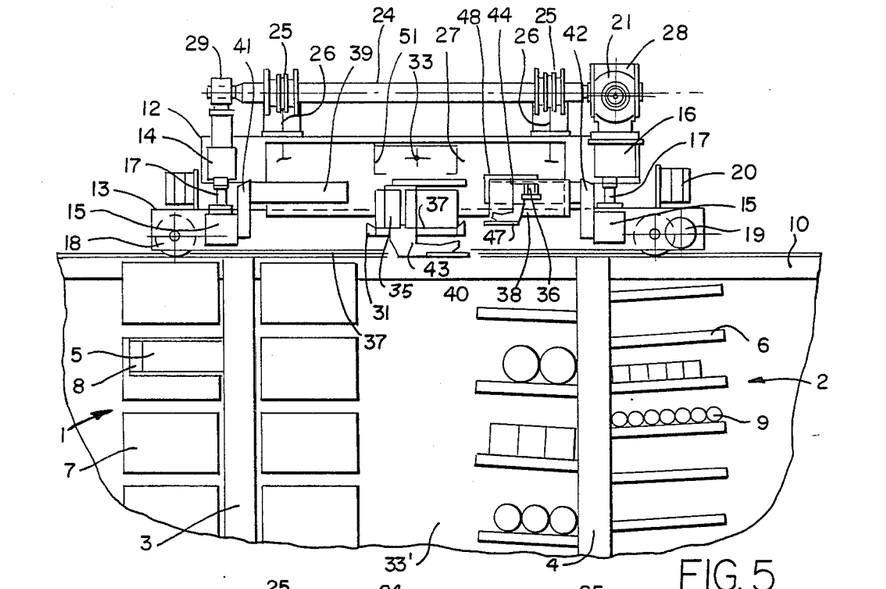
FIG. 5 is a simplified end view of a crane bridge similar to FIG. 1.

The lifting of one of the load cross-pieces 35 or 36 from the 'waiting position' shown in FIG. 1 takes place in the same manner as that already described for the manipulation of one of the pallet boxes 7, since with regard to the carrying bars 31 or the load beams 27 and the carriages 30, the load cross-pieces 35, 36 present themselves in just the same manner as the pallet boxes 7. As a result of the load beams 27 being moved vertically on the one hand and the carriages 30 being moved horizontally on the other hand, the load cross-piece 35 or 36 that has been lifted up can then be used for moving the material 9. In order to illustrate this by way of example, in FIG. 4, which corresponds to FIG. 1, the dotted lines show a lowered position of the load beams 27 with the lifted load cross-piece 35, it being shown at the same time that the load beams 27 can be guided during their vertical movement by rollers 49, 50 on the supports 3, 4.

As regards the electrical connection for the said light barriers arranged on the attachment means 45, 46 and 47, 48, this can be established between the carriages 30 or the carrying bars 31 and the respective load cross-piece 35 or 36, when the cross-piece is lifted in a manner now shown in detail.

Finally, in the case of the lifting connection between the carrying bars 31 on the one hand and the supports 37 and 38 of the load cross-pieces on the other hand, at the same time provision can be made, also by means of a suitable positively-locking connection or the like, for the load cross-pieces to be capable of non-horizontal displacement on the carrying bars 31. In this manner the load cross-pieces can be indexed with respect to the carrying bars, that is to say they can be exactly aligned, so that a defined position is provided for the numerical control of the system. In addition, and as best shown in FIGS. 1b and 2b as a supplement to this perfered embodiment, it is also possible to attach to the carriages 30 at a point above the load cross-pieces clamping devices 55, in the form of lifting cylinders which can be moved with the carriages and by means of which the cross-pieces can automatically be clamped against the carrying bars, so that during movement they are clamped between the lifting cylinders and the carrying bars.

FIGS. 1 to 4 show an example having a load cross-piece 35, 36 positioned inside the crane bridge 11 on each side of and at a distance from the said center position, the prongs on each side pointing in opposite directions and the load cross-pieces also being designed for material of different cross-sections. The load cross-pieces in the drawing may of course be interchanged so that the prongs on each side point away from one another.

Figure 6:
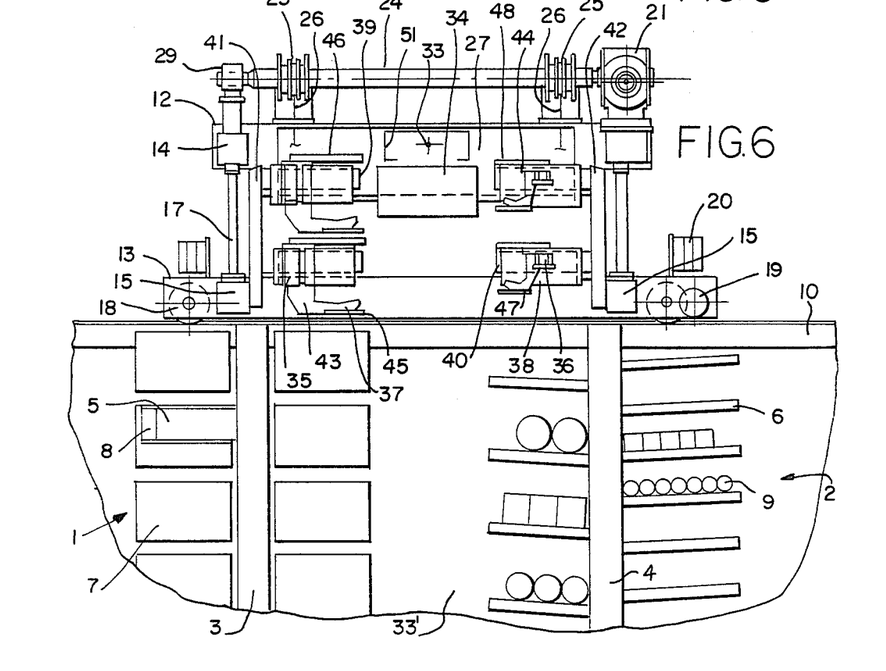
FIG. 6 is a simplified end view of a crane bridge in a variant embodiment to that shown in FIG. 1.

Above each of the load cross-pieces shown, it is also possible to arrange as shown in FIG. 6, in the same manner, a further load cross-piece in order to take account of material of wider cross-section or alternatively, with reference to material of a single cross-section, to keep a supply of prongs pointing in a different direction. In this connection it is necessary merely for the crane bridge 11 to be of correspondingly taller construction so that two further positions are available above the positions for the load cross-pieces shown.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A shelf service apparatus in the form of a crane for servicing a storage area for rod-shaped material, whether such material is accomodated in self-supporting pallet boxes or loosely stored, having stacking frames that are arranged transversely to the longitudinal direction of the storeroom and are in alignment with one another in the longitudinal direction of the storeroom, the frames being provided with pallet box supporting arms that are arranged in adjacent rows one above the other in the manner of shelves and extend in the longitudinal direction of the storeroom and are attached to vertical supports, said crane comprising a crane bridge which can be conveyed in the longitudinal direction of the storeroom and which extends transversely to the longitudinal direction of the storeroom, said crane includes load beams which are supported at both ends by support means in such a manner that they can be raised and lowered outside the stacking frames and on which, transverse to the longitudinal direction, carrying means having their free ends pointing toward the stacking frames can be displaced in the longitudinal direction of the storeroom and, as a result, on both sides of each shelf aisle thus forming a center position, said carrying means can be brought into engagement with supports projecting at the ends of the pallet boxes that are located at that point such they they support the pallet boxes, in which said crane bridge (11) includes, at least on one side close to the center position (33) of the carrying means (31), load cross-pieces (35, 36) of a same length as the pallet boxes (7), the load cross-pieces being movably arranged parallel to the pallet boxes on said load beam, the load cross-pieces having supports (37, 38) on their end faces corresponding to the supports on the pallet boxes, and positively connected to the load cross-pieces are load-lifting means (43, 44) which project horizontally on one side in the longitudinal direction of the storeroom and which can be inserted between the supporting arms by movement of the carrying means (31) in order to remove or store material (9) resting directly on supporting arms (6) of corresponding shelf compartments.

2. A shelf service apparatus according to claim 1, in which said supports (37,38) and carrying means (31) are constructed to engage one another in positively-locking manner in the vertical direction and in the longitudinal direction of the storeroom.

3. A shelf service apparatus according to claim 1, in which at least one vertically movable clamping device can be displaced by electrical, hydraulic or pneumatic means in the longitudinal direction of the storeroom with the carrying means (31), and the load cross-piece (35, 36) can be clamped against the carrying means (31) by the clamping device.

4. A shelf service apparatus according to claim 2, in which at least one vertically movable clamping device can be displaced by electrical, hydraulic or pneumatic means in the longitudinal direction of the storeroom with the carrying means (31), and the load cross-piece (35, 36) can be clamped against the carrying means (31) by the clamping device.

5. A shelf service apparatus according to claim 1, in which said load cross-pieces (35, 36) are arranged in the crane bridge (11) on both sides of the center position (33), and their load-lifting means (43, 44) point in opposite directions.

6. A shelf service apparatus according to claim 2, in which said load cross-pieces (35, 36) are arranged in the crane bridge (11) on both sides of the center position (33), and their load-lifting means (43, 44) point in opposite directions.

7. A shelf service apparatus according to claim 3, in which said load cross-pieces (35, 36) are arranged in the crane bridge (11) on both sides of the center position (33), and their load-lifting means (43, 44) point in opposite directions.

8. A shelf service apparatus according to claim 1, in which said load cross-pieces (35, 36) are arranged in said crane bridge (11) on both sides of the center position (33) with their load-lifting means (43, 44) designed for different material cross-sections.

9. A shelf service apparatus according to claim 2, in which load cross-pieces (35, 36) are arranged in said crane bridge (11) on both sides of the center position (33) with their load-lifting means (43, 44) designed for different material cross-sections.

10. A shelf service apparatus according to claim 3, in which load cross-pieces (35, 36) are arranged in said crane bridge (11) on both sides of the center position (33) with their load-lifting means (43, 44) designed for different material cross-sections.

11. A shelf service apparatus according to claim 1, in which a further load cross-piece is removably arranged above or below the load cross-pieces (35, 36) and the load beams (27) can be raised or lowered into the position corresponding to said further load cross-piece.

12. A shelf service apparatus according to claim 2, in which a further load cross-piece is removably arranged above or below the load cross-pieces (35, 36) and the load beams (27) can be raised or lowered into the position corresponding to said further load cross-piece.

13. A shelf service apparatus according to claim 3, in which a further load cross-piece is removably arranged above or below the load cross-pieces (35, 36) and the load beams (27) can be raised or lowered into the position corresponding to said further load cross-piece.

14. A shelf service apparatus according to claim 1, in which said load-lifting means are constructed in the form of prongs (43, 44).

15. A shelf service apparatus according to claim 2, in which said load-lifting means are constructed in the form of prongs (43, 44).

16. A shelf service apparatus according to claim 3, in which said load-lifting means are constructed in the form of prongs (43, 44).

17. A shelf service apparatus according to claim 1, characterized in that the load-lifting means (43,44) have sensors in the form of light barriers, for the material (9) and the supports (37, 38) on the load cross-pieces (35, 36) and the carrying means (31) have electrical contacts associated therewith for the connection of the sensors to the device for controlling the crane.

18. A shelf apparatus according to claim 2, characerized in that the load-lifting means (43, 44) have sensors in the form of light barriers, for the material (9) and the supports (37, 38) on the load cross-pieces (35, 36) and the carrying means (31) have electrical contacts associated therewith for the connection of the sensors to the device for controlling the crane.

19. A shelf service apparatus according to claim 3, characterized in that the load-lifting means (43, 44) have sensors in the form of light barriers, for the material (9) and the supports (37, 38) on the load cross-pieces (35, 36) and the carrying means (31) have electrical contacts associated therewith for the connection of the sensors to the device for controlling the crane.

* * * * *

UNITED STATES PATENT AND TRADEMARK OFFICE
CERTIFICATE OF CORRECTION

PATENT NO. : 4,778,325
DATED : October 18, 1988
INVENTOR(S) : PAUL STOLZER and RUDOLF BLUST It is certified that error appears in the above—identified patent and that said Letters Patent is hereby corrected as shown below:

On the Title Page, Item [73], should read

-- KEURO MASCHINENBAU GmbH & CO., KG
of Achern-Gamshurst, GERMANY --

Signed and Sealed this

Eighteenth Day of April, 1989

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,778,325

DATED : October 18, 1988

INVENTOR(S) : Paul STOLZER et al

It is certified that error appears in the above-identified patent and that said Letters Patent is hereby corrected as shown below:

Column 4, line 26, change "compartmets" to -- compartments --.

Column 5, line 10, change "stackig" to -- stacking --.

Column 6, line 42, delete "onto".

Column 7, line 37, change "now" to -- not --.

Column 7, line 49, change "perfered" to -- preferred --.

Signed and Sealed this

Fifth Day of June, 1990

Attest:

HARRY F. MANBECK, JR.

Attesting Officer

Commissioner of Patents and Trademarks